(12) United States Patent
Lee et al.

(10) Patent No.: US 11,603,009 B2
(45) Date of Patent: Mar. 14, 2023

(54) VEHICLE BATTERY EXCHANGE SYSTEM AND METHOD OF CONTROLLING THE SAME

(71) Applicants: HYUNDAI MOTOR COMPANY, Seoul (KR); KIA MOTORS CORPORATION, Seoul (KR)

(72) Inventors: Sang Heon Lee, Seoul (KR); Jin Ho Hwang, Seoul (KR); Dong Eun Cha, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 494 days.

(21) Appl. No.: 16/681,113

(22) Filed: Nov. 12, 2019

(65) Prior Publication Data

US 2020/0376977 A1 Dec. 3, 2020

(30) Foreign Application Priority Data

Jun. 3, 2019 (KR) .................. 10-2019-0065597

(51) Int. Cl.
*B60L 53/80* (2019.01)
*B60L 53/68* (2019.01)
(Continued)

(52) U.S. Cl.
CPC .............. *B60L 53/80* (2019.02); *B60L 53/62* (2019.02); *B60L 53/65* (2019.02); *B60L 53/665* (2019.02);
(Continued)

(58) Field of Classification Search
CPC .......... B60L 53/80; B60L 53/68; B60L 53/62; B60L 58/12; B60L 53/665; B60L 53/65; B60L 2250/20; G06Q 20/325
See application file for complete search history.

(56) References Cited

U.S. PATENT DOCUMENTS

| 9,103,686 B2 | 8/2015 | Pettersson |
| 9,275,505 B2 | 3/2016 | Taylor et al. |

(Continued)

FOREIGN PATENT DOCUMENTS

| JP | 2011-154693 A | 8/2011 |
| KR | 10-2016-0144323 A | 12/2016 |

(Continued)

OTHER PUBLICATIONS

Korean Office Action dated Aug. 6, 2021, issued in corresponding Korean Patent Application No. 10-2019-0065597.

(Continued)

*Primary Examiner* — Gregory S Cunningham, II
(74) *Attorney, Agent, or Firm* — Morgan, Lewis & Bockius LLP (57) ABSTRACT

A vehicle battery exchange system includes: a battery charger configured to store multiple batteries therein, and including a first battery locking device that is configured to be unlocked when each of the batteries is withdrawn from the battery charger and is configured to be locked when the batteries are stored in the battery charger, the battery charger charging a battery among the stored batteries when a state-of-charge of the corresponding battery is insufficient; and a server configured to: communicate with the battery charger and a vehicle and guiding the vehicle to a position of the battery charger when a charge request is received from the vehicle, control the first battery locking device to be unlocked when the vehicle is authenticated, and control the first battery locking device to be locked when exchange of batteries between the authenticated vehicle and the battery charger is completed.

13 Claims, 4 Drawing Sheets

(51) Int. Cl.
  *B60L 53/62* (2019.01)
  *B60L 58/12* (2019.01)
  *B60L 53/66* (2019.01)
  *B60L 53/65* (2019.01)
  *G06Q 20/32* (2012.01)

(52) U.S. Cl.
  CPC .............. *B60L 53/68* (2019.02); *B60L 58/12* (2019.02); *G06Q 20/325* (2013.01); *B60L 2250/20* (2013.01)

(56) References Cited

U.S. PATENT DOCUMENTS

| | | |
|---|---|---|
| 2008/0281732 A1 | 11/2008 | Yamada |
| 2010/0106401 A1* | 4/2010 | Naito ...................... B60L 53/00 701/533 |
| 2010/0274690 A1* | 10/2010 | Tate, Jr. ................. G06Q 30/04 705/30 |
| 2014/0053620 A1 | 2/2014 | Taylor et al. |
| 2016/0117759 A1* | 4/2016 | Penilla ..................... B60S 5/06 705/26.9 |
| 2017/0364995 A1* | 12/2017 | Yan .......................... H02J 7/007 |
| 2018/0029496 A1* | 2/2018 | Hall .................... G07F 17/0014 |
| 2018/0222343 A1* | 8/2018 | Uchida .............. G06Q 30/0631 |
| 2019/0333037 A1* | 10/2019 | Rayner ............. G06Q 20/3276 |
| 2020/0384879 A1* | 12/2020 | Ebisu ....................... G08G 1/00 |

FOREIGN PATENT DOCUMENTS

| | | |
|---|---|---|
| KR | 10-2017-0014460 A | 2/2017 |
| KR | 10-1759246 B1 | 7/2017 |
| WO | 2013/080211 A1 | 6/2013 |

OTHER PUBLICATIONS

"Mobile app lockers—Workplace locker," Retrieved from https://www.workplacelockers.com/mobile-app-lockers, 2019.

Office Action dated Oct. 20, 2022, issued in corresponding European Patent Application No. 19207939.0.

* cited by examiner

VEHICLE BATTERY EXCHANGE SYSTEM AND METHOD OF CONTROLLING THE SAME

CROSS REFERENCE TO RELATED APPLICATION

The present application claims priority to Korean Patent Application No. 10-2019-0065597, filed Jun. 3, 2019, the entire contents of which is incorporated herein for all purposes by this reference.

TECHNICAL FIELD

The present disclosure relates to a vehicle battery exchange system and a method of controlling the same, wherein home owners have battery chargers installed in parking areas of their houses, and allow exchange of batteries of other people's vehicles with new batteries, and thus earn profits therefrom, thereby dismissing concerns of a vehicle owner about a battery of an electric vehicle, or the like.

BACKGROUND

Recently, due to environmental problems, the supply of electric vehicles has increased. However, charging of a battery is indispensable for an electric vehicle, so that there is a limit in supply of electric vehicles for an area where the infrastructure for charging the battery is not established.

Thus, the technology that recently has been studied is about exchanging batteries rather than charging the battery, but this also requires sufficient supply of the infrastructure for exchanging the batteries to expect wide use of electric vehicles.

However, in the related art, there are few infrastructures for charging or exchanging the batteries and it is thus difficult to access the such an infrastructure, thus there is a limit in sufficient supply of electric vehicles.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose a vehicle battery exchange system and a method of controlling the same, wherein home owners have battery chargers installed in parking areas of their houses, and allow an exchange of batteries of other people's vehicles with new batteries, and thus earn profits therefrom, thereby dismissing concerns of a vehicle owner about a battery of an electric vehicle, or the like.

In order to achieve the above object, according to one aspect of the present disclosure, a vehicle battery exchange system includes a battery charger configured to store multiple batteries therein, the battery charger including a first battery locking device configured to be unlocked when each of the batteries is withdrawn from the battery charger and to be locked when the batteries are stored in the battery charger. The battery charger charges a battery among the stored batteries when a state-of-charge of the corresponding battery is insufficient. The vehicle battery exchange system further includes a server communicating with the battery charger and a vehicle and guiding the vehicle to a position of the battery charger when a charge request is received from the vehicle. The server is configured to control the battery locking device to be unlocked when the vehicle is authenticated, and to control the first battery locking device to be locked when exchange of batteries between the authenticated vehicle and the battery charger is completed.

The server may control the first battery locking device to be unlocked when the vehicle is authenticated and payment for the exchange of the batteries is completed with a vehicle manager.

After the payment for the exchange of the batteries is completed with the vehicle manager, the server may perform cost settlement for the exchange of the batteries with a manager of a parking area.

The server may include information on durability of each of the batteries stored in the battery charger, and may be configured to conduct the payment for the exchange of the batteries with the vehicle manager, the payment including a deposit, and to deduct, when the exchange of the batteries between the authenticated vehicle and the battery charger is completed, a differential amount of money based on durability of the exchanged batteries from the deposit and then refund a resulting deposit to the vehicle manager.

The server may refund the deposit in full to the vehicle manager, when durability of the battery moved from the vehicle to the battery charger is higher than durability of the battery moved from the battery charger to the vehicle.

The battery charger may include information on durability of each of the batteries stored in the battery charger, and the server may be configured to conduct the payment for the exchange of the batteries with the vehicle manager, the payment including a deposit, and to deduct, when the exchange of the batteries between the authenticated vehicle and the battery charger is completed, a differential amount of money based on durability of the exchanged batteries from the deposit and then refund a resulting deposit to the vehicle manager.

The server may include information on durability of each of the batteries stored in the battery charger, and may determine that the battery of which the durability is degraded to or below a predetermined level needs to be collected.

When the server guides the vehicle to the position of the battery charger, the server may provide the vehicle with guidance information including at least one piece of information among information on a distance from the vehicle, the number of the batteries, durability of the batteries, and an exchange price.

The server may control a second battery locking device of the vehicle to be unlocked when the vehicle is authenticated, and may control the second battery locking device to be locked when the exchange of the batteries between the authenticated vehicle and the battery charger is completed.

The server may determine that the vehicle arrives in a parking area when arrival information is received from the vehicle, and may control the first battery locking device to be unlocked when the vehicle is authenticated and arrives in the parking area.

The server may be configured to provide password information to a terminal or the vehicle of the vehicle manager when the payment for the exchange of the batteries is completed with the vehicle manager, to determine that the vehicle arrives in a parking area when the password information is received from the terminal or the vehicle of the vehicle manager, and to control the first battery locking device to be unlocked when the vehicle is authenticated and arrives in the parking area.

The vehicle manager may be a vehicle owner or vehicle driver, and communication between the server and the vehicle may be performed by direct wireless communication with the vehicle or wireless communication via a terminal of the vehicle manager. A parking area may be a parking area of a house, and the battery charger may receive, when the state-of-charge of the battery stored therein is insufficient, power from the house to which the battery charger belongs so as to charge the battery.

According to another aspect of the present disclosure, a method of controlling a vehicle battery exchange system includes: receiving, by a server, a charge request from a vehicle; guiding, by the server, the vehicle to a position of a battery charger; performing authentication between the server and the vehicle; controlling, by the server, a battery locking device of the battery charger to be unlocked when the vehicle is authenticated; and controlling, by the server, the battery locking device to be locked when exchange of batteries between the authenticated vehicle and the battery charger is completed.

According to the vehicle battery exchange system and the method of controlling the same of the present disclosure, home owners have battery chargers installed in the parking areas of the houses, and allow exchange of batteries of other person's vehicles with new batteries, and thus earn profits therefrom. Therefore, vehicle owners are able to dismiss concerns about batteries of electric vehicles, or the like.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
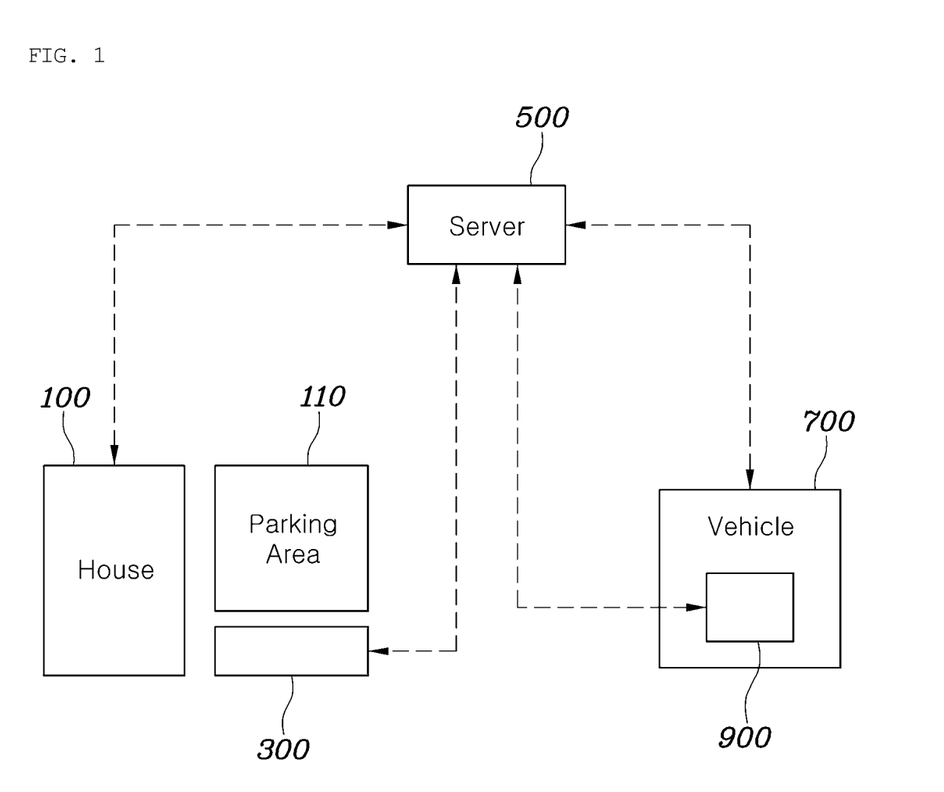
FIG. 1 is a diagram illustrating a configuration of a vehicle battery exchange system according to an exemplary embodiment of the present disclosure.
Figure 2:
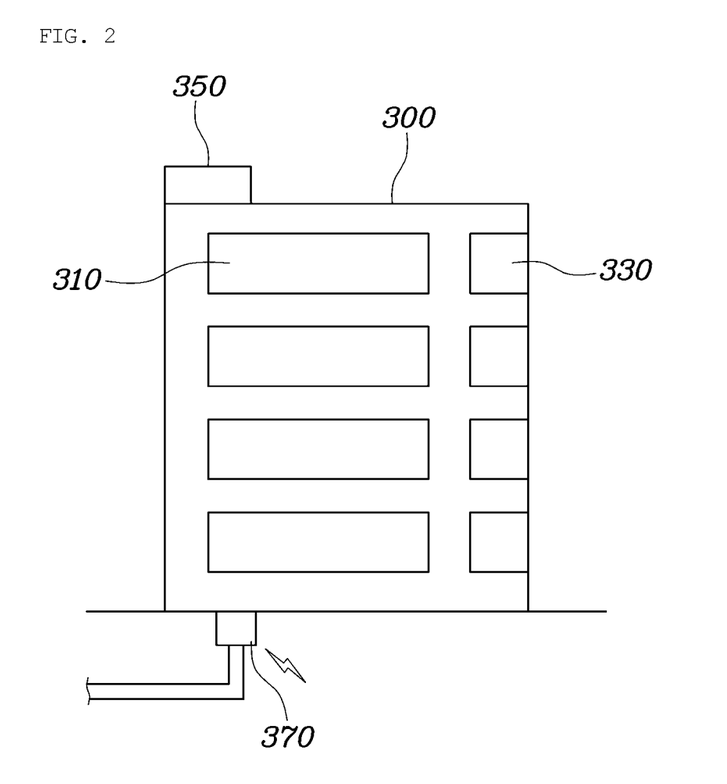
FIG. 2 is a diagram illustrating a battery charger of a vehicle battery exchange system according to an exemplary embodiment of the present disclosure.
Figure 3:
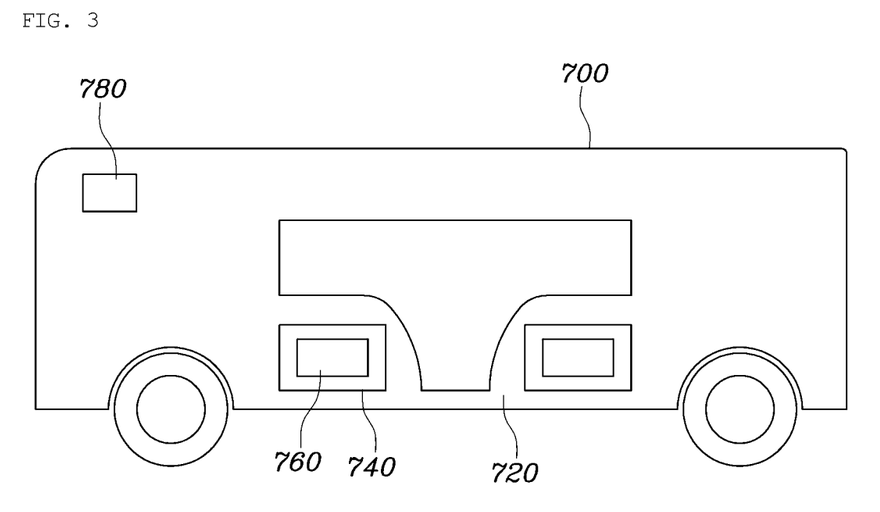
FIG. 3 is a diagram illustrating a vehicle in a vehicle battery exchange system according to an exemplary embodiment of the present disclosure.
Figure 4:
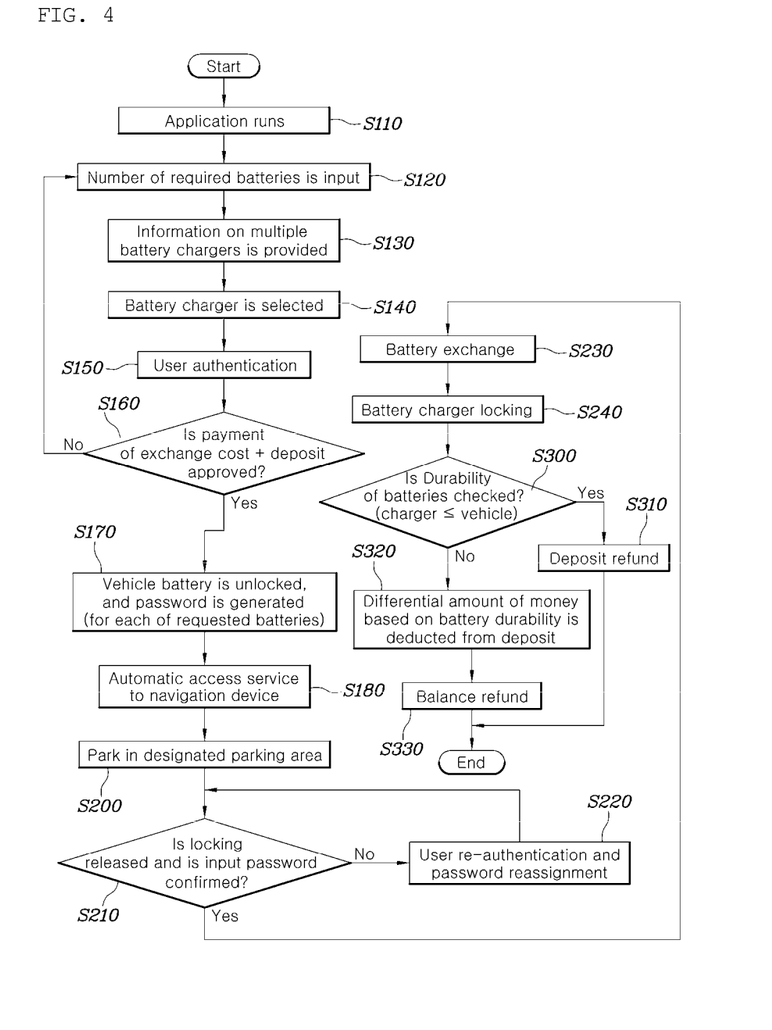
FIG. 4 is a flowchart illustrating a method of controlling a vehicle battery exchange system according to an exemplary embodiment of the present disclosure.

FIG. 1 is a diagram illustrating a configuration of a vehicle battery exchange system according to an exemplary embodiment of the present disclosure. FIG. 2 is a diagram illustrating a battery charger of a vehicle battery exchange system according to an exemplary embodiment of the present disclosure. FIG. 3 is a diagram illustrating a vehicle in a vehicle battery exchange system according to an exemplary embodiment of the present disclosure. FIG. 4 is a flowchart illustrating a method of controlling a vehicle battery exchange system according to an exemplary embodiment of the present disclosure.

FIG. 1 is a diagram illustrating a configuration of a vehicle battery exchange system according to an exemplary embodiment of the present disclosure. The vehicle battery exchange system according to the present disclosure includes: a battery charger 300 provided on a left side of a parking area 110, provided with multiple batteries 310 loaded therein, and provided with a battery locking device 330 that is unlocked when each of the batteries 310 is withdrawn and is locked when the batteries are in storage, the battery charger charging, when a state-of-charge of the stored battery 310 is insufficient, the battery 310; and a server 500 communicating with the battery charger 300 and a vehicle 700 and guiding the vehicle 700 to a position of the battery charger 300 when a charge request is received from the 700, the server controlling the battery locking device 330 of the battery charger 300 when the vehicle 700 is authenticated, and controlling the battery locking device 330 of the battery charger 300 when exchange of batteries between the authenticated vehicle 700 and the battery charger 300 is completed.

In the case of the electric vehicle, or the like, a high voltage battery 760 equipped in the vehicle 700 supplies the driving energy for the vehicle 700, so that the high voltage battery 760 needs to be charged periodically. However, with current battery technology, the charging takes a lot of time. Therefore, in the present disclosure, charging the battery is possible, but the present disclosure is especially about a method of exchanging batteries.

To this end, in the present disclosure, the battery charger 300 provided in a parking area 110 of a building 100 and the server 500 are included. Further, the vehicle 700 communicates with the battery charger 300 or the server 500 to fairly pay for the exchange of batteries.

Specifically, the battery charger 300 is provided around the parking area 110, namely, the left side of the parking area 110, so that the vehicle 700 of the owner of the parking area 110 or of another person is parked and the exchange of batteries is performed. Accordingly, it is convenient for the driver of another vehicle to exchange the battery, and the inconvenience of charging the electric vehicle is resolved, thereby enhancing the availability of the electric vehicle. The owner of the building or the parking area is capable of earning unique profit from a battery exchange business, which is a beneficial system for everyone.

In the meantime, the battery charger 300 is provided with multiple batteries 310 loaded therein and is provided with the battery locking device 330 that is unlocked when each of the batteries 310 is withdrawn, and is locked when the batteries 310 is in storage. FIG. 2 is a diagram illustrating a battery charger of a vehicle battery exchange system according to an embodiment of the present disclosure. As shown in FIG. 2, the battery charger 300 is provided with multiple batteries 310 loaded therein in a slidable manner. Further, in order to prevent arbitrary withdrawal of the battery 310, the battery locking device 330 is provided. The battery locking device 330 is unlocked and opened only when allowed, thereby being implemented as a door that protects the batteries from wind and rain and prevents forced withdrawal by other people.

Further, the battery charger 300 is configured to, when the state-of-charge of a particular battery 310 stored is insufficient, charge the battery 310. A connector 370 is provided to charge the battery 310 and receives power from the nearby building 100 of the parking space owner to charge the battery 310, thereby maintaining a state in which exchange of the battery 310 is possible anytime.

Further, the server 500 performs communication through wired or wireless communication, and communicates with the battery charger 300 and the vehicle 700. Furthermore, the server 500 guides, when receiving a charge request remotely from a particular vehicle 700, the vehicle 700 to the location of the battery charger 300. The battery charger is installed in every multiple building or parking area nearby the vehicle 700, so that information on various battery chargers is provided to the vehicle in such a manner as to select a particular battery charger.

Further, the server 500 controls the battery locking device 330 of the battery charger 300 to be unlocked when the vehicle 700 is authenticated, and controls the battery locking device 330 of the battery charger 300 to be locked when the exchange of the batteries between the authenticated vehicle 700 and the battery charger 300 is completed. As an example of the authentication of the vehicle, there is a method in which through wireless communication, the server authenticates a mobile terminal of the vehicle owner, driver, or fellow passenger, or directly communicates with the vehicle to authenticate the vehicle.

That is, when a particular battery charger 300 is selected by the vehicle 700, the vehicle 700 is guided to the battery charger 300, and only when the authentication of the vehicle 700 is completed, the battery locking device 330 of the battery charger 300 is unlocked, thereby preventing the battery 310 from being stolen arbitrarily. After the exchange of the batteries, the battery locking device 330 is locked to protect the batteries 310.

To this end, the battery locking device 330 determines, when the battery 310 is withdrawn and a new battery is inserted, that the exchange of the batteries is completed. Alternatively, each battery has unique identification information, and with the identification information, it is identified that the battery 310 of the battery charger 300 is loaded in the vehicle 700 and that the high voltage battery 760 of the vehicle 700 is loaded in the battery charger 300.

FIG. 3 is a diagram illustrating a vehicle in a vehicle battery exchange system according to an exemplary embodiment of the present disclosure. A low door side chamber 720 of the vehicle is equipped with the high voltage battery 760 therein to provide power to a driving unit. Further, at an opening through which the high voltage battery 760 is slid, a battery locking device 740 is provided to allow withdrawal or storage of the high voltage battery 760. The battery locking device 740 is implemented as a door or various lockers. Further, the vehicle 700 is provided with a communication unit 780 to communicate with the server 500, or communicate with the server through a mobile terminal 900 of the vehicle occupant.

In the meantime, the server 500 controls, when the vehicle 700 is authenticated and payment for the exchange of batteries is completed with a vehicle manager, the battery locking device 330 of the battery charger 300 to be unlocked. That is, the vehicle manager needs authentication of the vehicle 700 from the server 500, and even though the authentication is completed, only when the payment for the exchange of batteries is completed, the battery locking device 330 of the battery charger 300 is unlocked. The payment is made online by credit cards, transfer, or the like. The vehicle manager may refer to, e.g., the owner or driver of the vehicle or a service subscriber of the present disclosure, who has authority to manage the battery of the vehicle.

Further, after the payment for the exchange of batteries is completed with the vehicle manager, the server 500 performs cost settlement for the exchange of batteries with the manager of the parking area. That is, the server 500 can be paid by the vehicle manager for the exchange cost first, and transfers the cost to the manager of the battery charger or manager of the parking area through payment. The manager of the parking area may refer to, e.g., the owner or manager of the building or house with the parking area, or may refer to, e.g., the professional manager of the parking area.

With this structure, the vehicle owner pays a fair price for a fully-charged battery to receive power conveniently, and the manager of the building obtains additional income.

The server 500 includes information on durability of each of the batteries 310 stored in the battery charger 300. When the payment for the exchange of batteries is made by the vehicle manager, the payment includes a deposit. When the exchange of batteries between the authenticated vehicle 700 and the battery charger 300 is completed, a differential amount of money based on the durability of the exchanged batteries is deducted from the deposit and the resulting deposit is refunded to the vehicle manager. That is, a battery deteriorates depending on the number of times that the battery is used and the use environment, which is represented by durability or efficiency of the battery. The server 500 monitors the number of times that the battery is used and the use environment, and tracks the durability of each battery loaded in the battery charger 300 or in the vehicle 700 to store information on the durability in a database.

Further, before the battery of the vehicle 700 is replaced, the deposit is secured from the vehicle owner, and after the exchange of batteries, the deposit is to be settled. That is, when the durability of the high voltage battery 760 of the vehicle lower than the durability of the battery 310 of the battery charger 300, the corresponding amount of money is deducted from the deposit and the resulting deposit is refunded, whereby the batteries are exchanged fairly without loss to each other.

Further, when the durability of the battery moved from the vehicle 700 to the battery charger 300 is higher than the durability of the battery moved from the battery charger 300 to the vehicle 700, the server 500 refunds all the deposit to the vehicle manager. That is, in this case, this is a structure that vehicle owner may have loss, so that all the paid deposit is refunded or a larger amount of money than the deposit is provided depending on the case. Even though a battery in good condition is handed into the battery charger 300, at least the deposit needs to be guaranteed in full.

As another embodiment, the battery charger 300 includes information on durability of each of the batteries 310 stored in the battery charger 300. The server 500 conducts the payment for the exchange of batteries with the vehicle manager, in which the payment includes a deposit. When the exchange of batteries between the authenticated vehicle 700 and the battery charger 300 is completed, the differential amount of money based on the durability of the exchanged batteries is deducted from the deposit and then the resulting deposit is refunded to the vehicle manager. That is, information on the durability of the battery is stored in the battery charger 300 rather than being managed by the server 500, and it is possible that the server 500 utilizes this through communication to settle the deposit.

In the meantime, the server 500 includes the information on the durability of each of the batteries 310 stored in the battery charger 300, and determines that the battery 310 of which the durability is degraded to or below a predetermined level needs to be collected. Through this, the battery 310 stored in the battery charger 300 does not cause any problem in use in the vehicle. The battery 310 of which the durability is degraded too much is replaced by the service manager in the future so that only batteries 310 having no problem in use are circulated through vehicles so as to ensure the users are not to dissatisfied with the service.

Further, when the server 500 guides the vehicle 700 to the position of the battery charger 300, guidance information including at least one piece of information among information on the distance from the vehicle 700, on the number of the batteries, on durability of the battery, or on an exchange price is provided to the vehicle 700. Through this, the driver of the vehicle is capable of finding the required battery charger 300 by selecting the battery charger 300.

Furthermore, the server 500 controls the battery locking device 740 of the vehicle to be unlocked when the vehicle 700 is authenticated, and controls the battery locking device 740 of the vehicle 700 to be locked when the exchange of batteries between the authenticated vehicle 700 and the battery charger 300 is completed. That is, not only the battery locking device 330 of the battery charger 300 but also the battery locking device 740 of the vehicle 700 is controlled to be locked or unlocked. Through this, it is possible that the high voltage battery 760 is prevented from being unnecessarily or insecurely detached from the vehicle 700, and the high voltage battery 760 of the vehicle is prevented from being arbitrarily lost. Therefore, in this case, only when the vehicle 700 is authenticated, the battery locking device 740 of the vehicle is unlocked, and when the exchange of batteries is completed, the battery locking device 740 of the vehicle is locked.

Further, when the server 500 receives arrival information from the vehicle 700, the server 500 determines that the vehicle 700 arrives in the parking area 110. When the vehicle 700 is authenticated and arrives in the parking area 110, the server 500 controls the battery locking device 330 of the battery charger 300 to be unlocked. Specifically, when the payment for the exchange of batteries is completed with the vehicle manager, the server 500 provides password information to the terminal 900 or the vehicle 700 of the vehicle manager. The server 500 receives the password information from the terminal 900 or the vehicle 700 of the vehicle manager, and determines that the vehicle 700 arrives in the parking area 110 when the passwords match. When the vehicle 700 is authenticated and arrives in the parking area 110, the server 500 controls the battery locking device 330 of the battery charger 300 to be unlocked.

That is, when the battery locking device of the battery charger 300 is unlocked before the vehicle 700 arrives, the battery 310 is likely to be lost, so that the battery locking device of the battery charger 300 may be unlocked at the point in time when the vehicle 700 arrives and the exchange is performed. To this end, the position of the vehicle 700 is tracked by the server 500 to detect that the vehicle arrives in the parking area 110. Alternatively, after the vehicle manager arrives in the parking area 110, the vehicle manager inputs the password to the battery charger 300 or the mobile terminal 900 of the vehicle manager, thereby enabling the battery locking device 330 to be unlocked through the server 500. Further, the password is given only when user authentication as well as the payment for the exchange is completed, thereby securely managing the batteries.

Here, the vehicle manager is the vehicle owner or vehicle driver, and communication between the server 500 and the vehicle 700 is performed by direct wireless communication with the vehicle or wireless communication via the mobile terminal 900 of the vehicle manager. Further, the parking area 110 is the parking area 110 of the house 100. The battery charger 300 receives, when the state-of-charge of the battery 310 stored in the battery charger 300 is insufficient, power from the house 100 to which the battery charger 300 belongs so as to charge the battery 310.

FIG. 4 is a flowchart illustrating a method of controlling a vehicle battery exchange system according to an embodiment of the present disclosure. The method of controlling the vehicle battery exchange system of the present disclosure includes: receiving, by a server, a charge request from a vehicle; guiding, by the server, the vehicle to a position of a battery charger; performing authentication between the server and the vehicle; controlling, by the server, a battery locking device of the battery charger to be unlocked when the vehicle is authenticated; and controlling, by the server, the battery locking device of the battery charger to be locked when exchange of batteries between the authenticated vehicle and the battery charger is completed.

Specifically, first, an application runs on the mobile terminal of the vehicle manager at step S110. Next, the server receives the number of batteries that need to be replaced from the vehicle or the terminal at step S120. The server provides positions of multiple battery chargers and information thereon via the terminal at step S130. The vehicle manager selects the required battery charger at step S140. Authentication of the vehicle manager is performed via the terminal at step S150. The required exchange cost and deposit are paid following the instructions of the server at step S160.

After confirming that the payment is completed, the server performs unlock control so that the corresponding battery of the vehicle is withdrawn. A password is generated and provided to the vehicle manager at step S170. Guidance to the corresponding battery charger is performed or through autonomous driving at step S180. The vehicle is parked in a designated parking area at step S200, and after the password is confirmed, the battery locking device of the corresponding battery charger is unlocked at step S210. When the password is wrong, authentication and assignment of a password is performed again at step S220.

When the exchange of batteries is completed at step S230, the battery locking devices of the battery charger and of the vehicle are locked at step S240 so that the batteries are protected.

Durability of the exchanged batteries is checked at step S300. When the durability of the battery that was in the vehicle is higher, the deposit is refunded in full at step S310. When the durability of the battery that was in the battery charger is higher, the amount of money corresponding to the difference in durability is deducted at step S320 and the balance is settled and refunded at step S330. Therefore, the deal is fair to each party.

According to the vehicle battery exchange system and the method of controlling the same of the present disclosure, home owners have battery chargers installed in the parking areas of the houses, and allow the exchange of batteries of other people's vehicles with new batteries, and thus earn profits therefrom. Therefore, the vehicle owners are able to dismiss concerns about batteries of electric vehicles, or the like.

Although the exemplary embodiments of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A vehicle battery exchange system comprising:
   a battery charger configured to store multiple batteries therein, and including a first battery locking device that is configured to be unlocked when each of the batteries is withdrawn from the battery charger and is configured to be locked when the batteries are stored in the battery charger, the battery charger charging a battery among the stored batteries when a state-of-charge of the corresponding battery is insufficient; and a server configured to:
communicate with the battery charger and a vehicle and guide the vehicle to a position of the battery charger when a charge request is received from the vehicle,
control the first battery locking device to be unlocked when the vehicle is authenticated, and
control the first battery locking device to be locked when exchange of batteries between the authenticated vehicle and the battery charger is completed,
wherein the server includes information on durability of each of the batteries in the battery charger, and
wherein the server is configured to:
conduct payment for the exchange of batteries with a vehicle manager, the payment including a deposit, and
when the exchange of batteries between the authenticated vehicle and the battery charger is completed, deduct a differential amount of money based on durability of the exchanged batteries from the deposit and then refund a resulting deposit to the vehicle manager.

2. The vehicle battery exchange system of claim 1, wherein the server controls the first battery locking device to be unlocked when the vehicle is authenticated and the payment for the exchange of batteries is completed with the vehicle manager.

3. The vehicle battery exchange system of claim 2, wherein after the payment for the exchange of batteries is completed with the vehicle manager, the server performs cost settlement for the exchange of batteries with a manager of a parking area.

4. The vehicle battery exchange system of claim 2, wherein the battery charger includes the information on the durability of each of the batteries in the battery charger.

5. The vehicle battery exchange system of claim 2, wherein the server is configured to:
provide password information to a terminal of the vehicle manager or the vehicle when the payment for the exchange of batteries is completed with the vehicle manager,
determine that the vehicle arrives in a parking area when the password information is received from the terminal or the vehicle of the vehicle manager, and
control the first battery locking device to be unlocked when the vehicle is authenticated and arrives in the parking area.

6. The vehicle battery exchange system of claim 2, wherein the vehicle manager is a vehicle owner or a vehicle driver, and
wherein communication between the server and the vehicle is performed by direct wireless communication with the vehicle or wireless communication via a terminal of the vehicle manager.

7. The vehicle battery exchange system of claim 1, wherein the server refunds the deposit in full to the vehicle manager, when durability of batteries moved from the vehicle to the battery charger is higher than durability of batteries moved from the battery charger to the vehicle.

8. The vehicle battery exchange system of claim 1, wherein the server determines that a battery of which the durability is degraded to or below a predetermined level needs to be collected.

9. The vehicle battery exchange system of claim 1, wherein when the server guides the vehicle to the position of the battery charger, the server provides the vehicle with guidance information including at least one piece of information among information on a distance from the vehicle, a number of the batteries, the durability of the batteries, or an exchange price.

10. The vehicle battery exchange system of claim 1, wherein the server controls a second battery locking device of the vehicle to be unlocked when the vehicle is authenticated, and controls the first battery locking device to be locked when the exchange of batteries between the authenticated vehicle and the battery charger is completed.

11. The vehicle battery exchange system of claim 1, wherein the server determines that the vehicle arrives in a parking area when arrival information is received from the vehicle, and controls the first battery locking device to be unlocked when the vehicle is authenticated and arrives in the parking area.

12. The vehicle battery exchange system of claim 1,
wherein a parking area is a parking area of a house, and
wherein, when the state-of-charge of the battery stored therein is insufficient, the battery charger receives power from the house to which the battery charger belongs so as to charge the battery.

13. A method of controlling a vehicle battery exchange system, the method comprising:
receiving, by a server, a charge request from a vehicle;
guiding, by the server, the vehicle to a position of a battery charger;
performing authentication between the server and the vehicle;
controlling, by the server, a first battery locking device of the battery charger to be unlocked when the vehicle is authenticated;
controlling, by the server, the first battery locking device to be locked when exchange of batteries between the authenticated vehicle and the battery charger is completed,
wherein the server includes information on durability of each of the batteries in the battery charger;
conducting, by the server, payment for the exchange of batteries with a vehicle manager, the payment including a deposit, and
after the exchange of batteries between the authenticated vehicle and the battery charger is completed, deducting, by the server, a differential amount of money based on durability of the exchanged batteries from the deposit and refunding a resulting deposit to the vehicle manager.

* * * * *